United States Patent Office

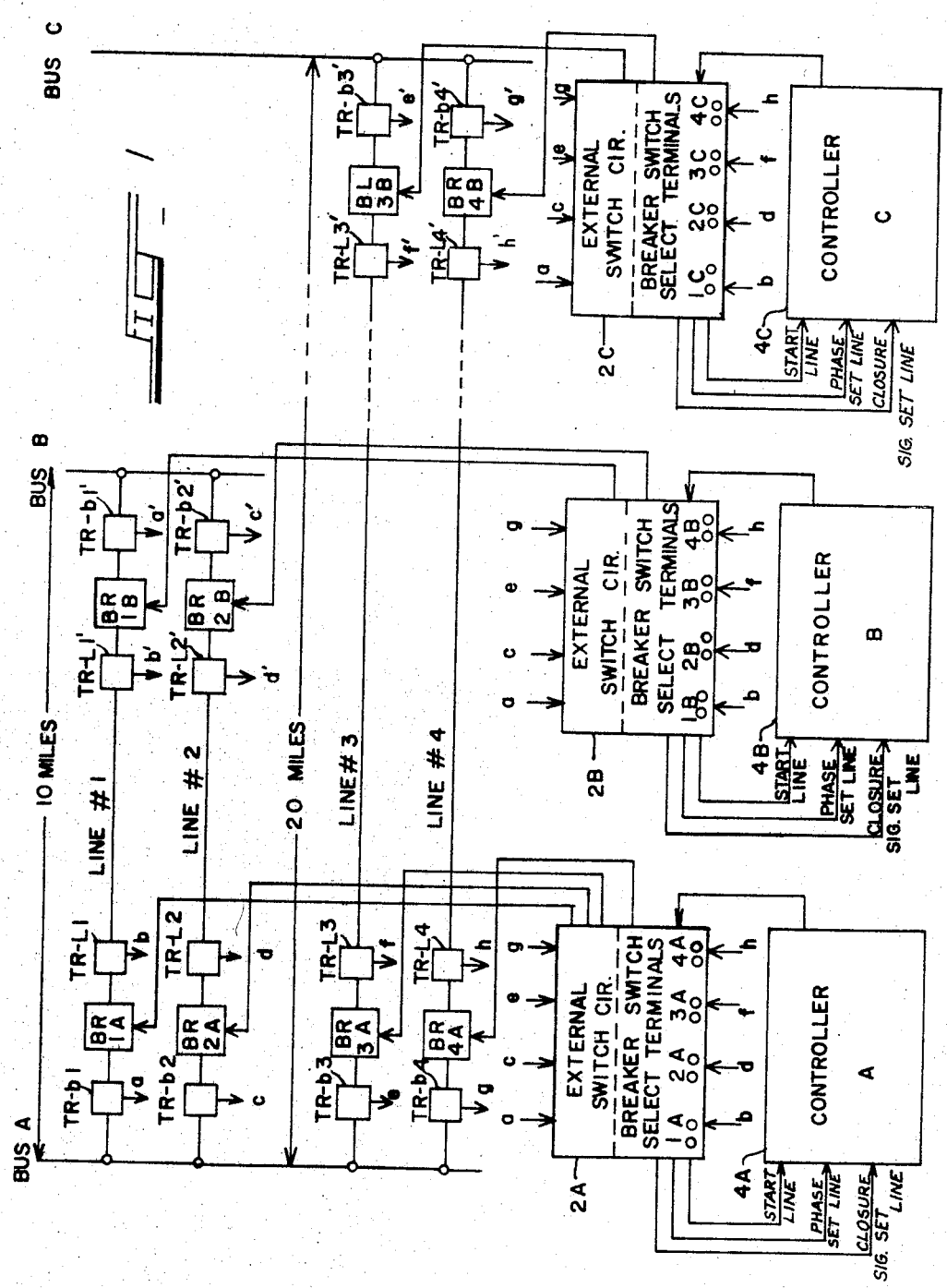
INVENTORS.
ROBERT W. BECKWITH
ELIASZ POSS
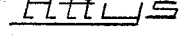

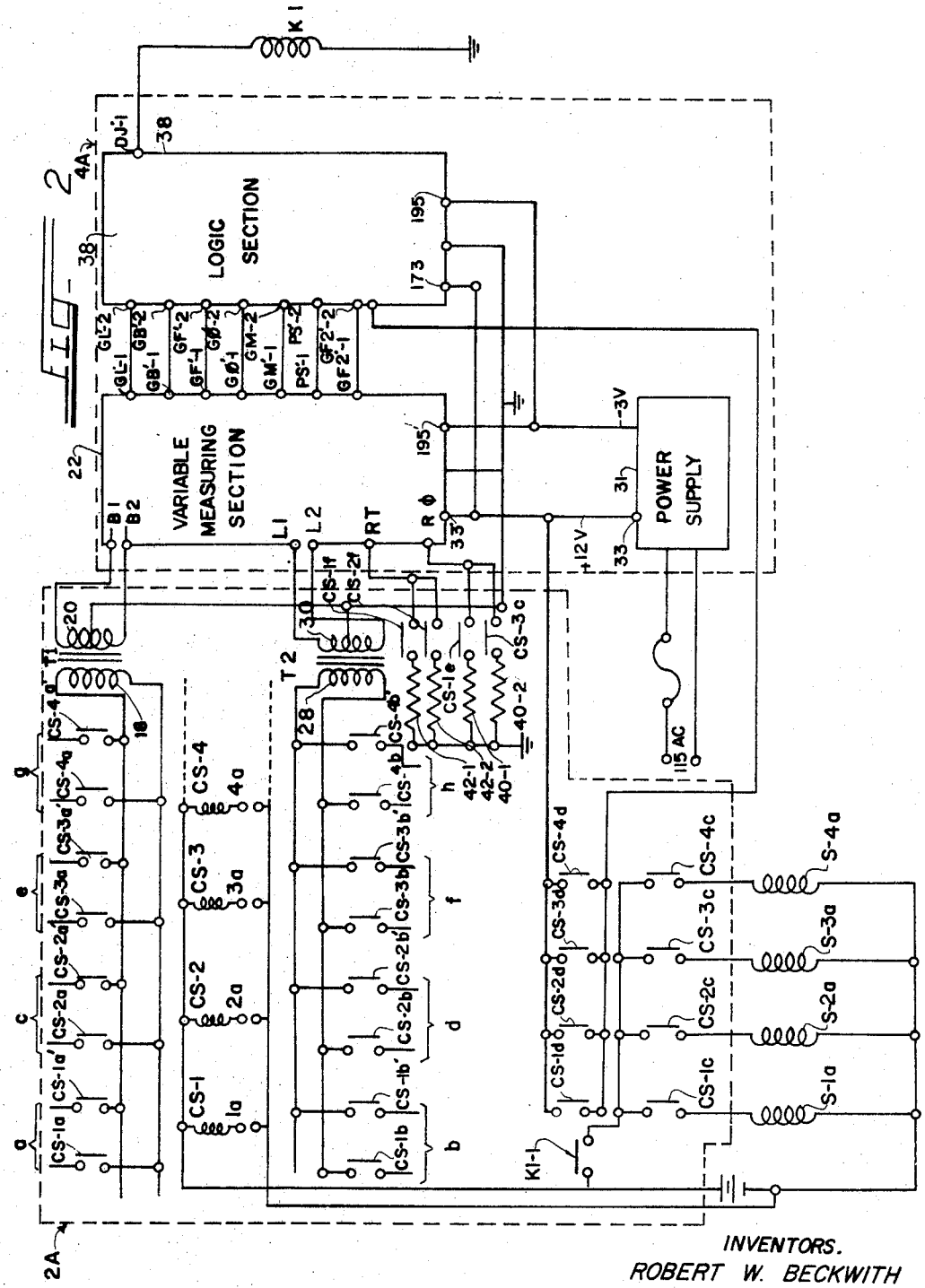

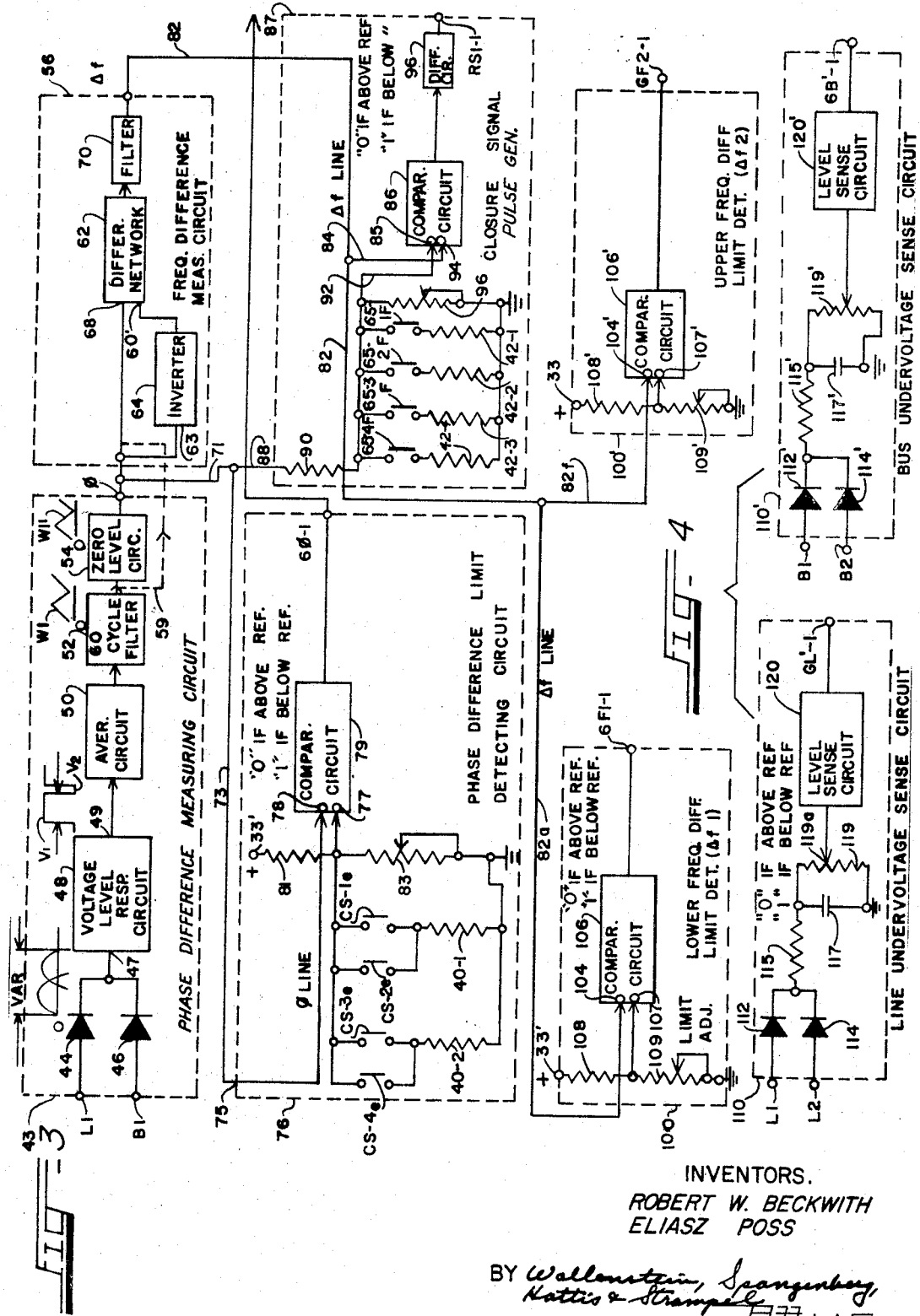

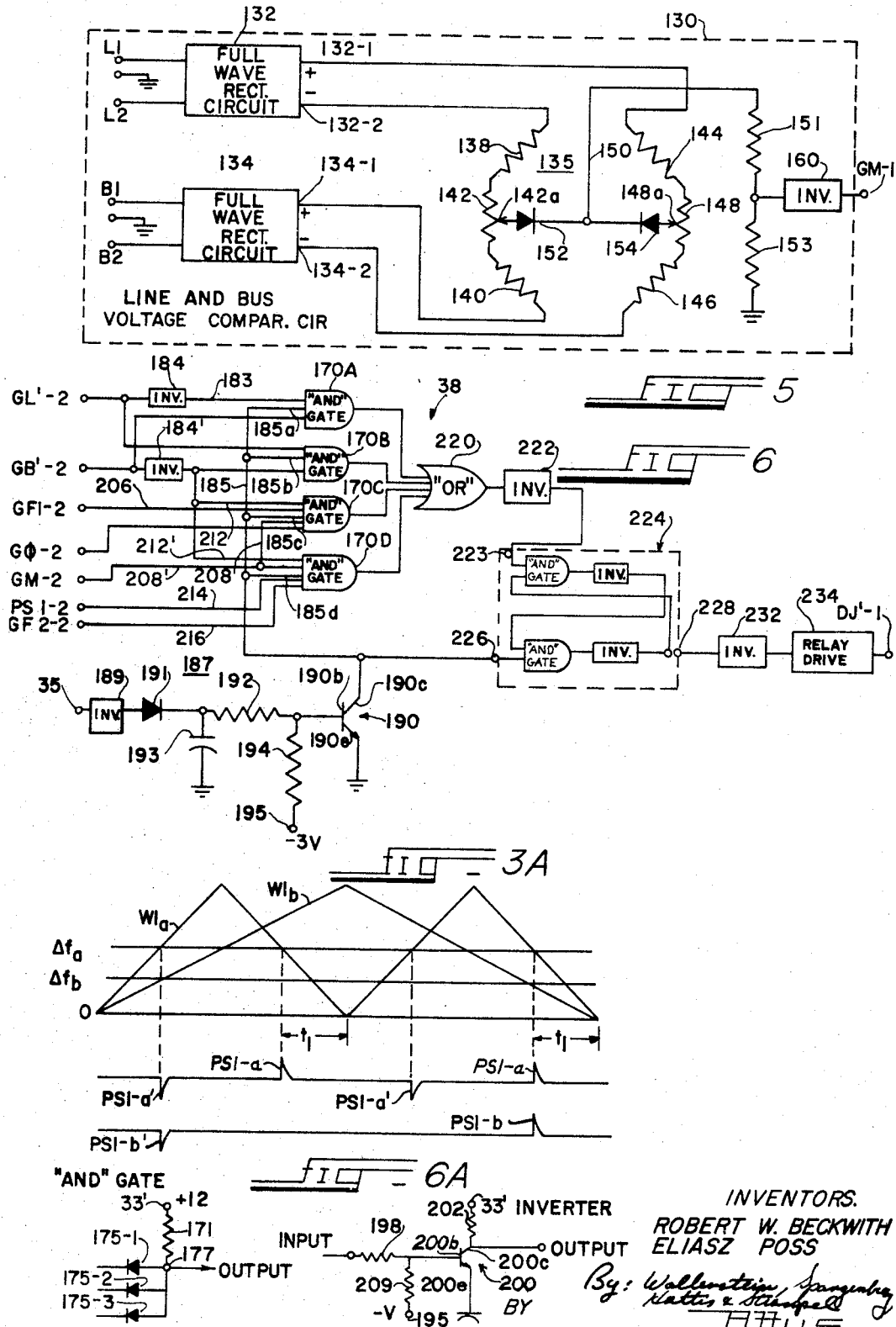

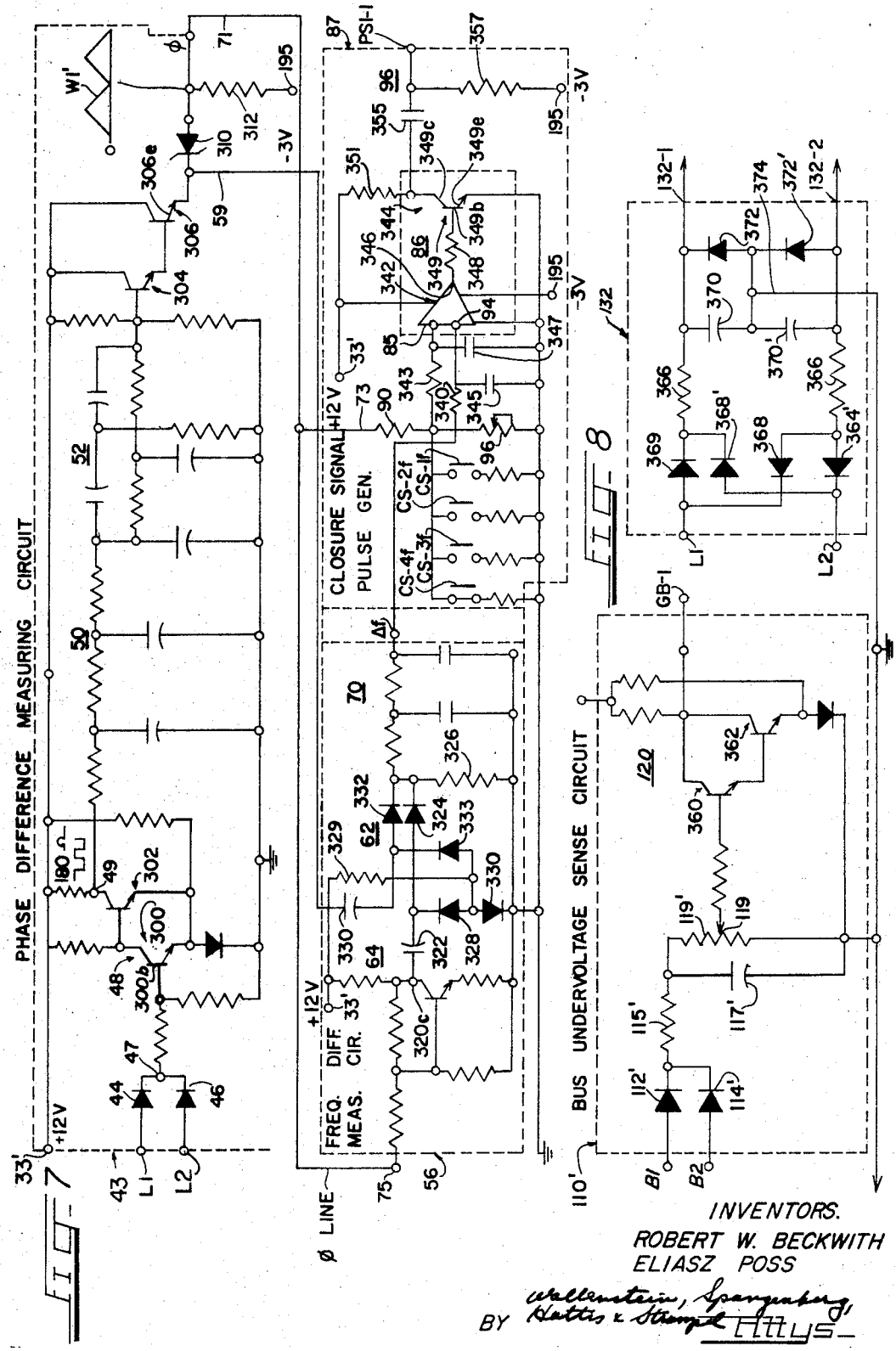

3,491,248
Patented Jan. 20, 1970

3,491,248
**POWER TRANSMISSION LINE SWITCH
CONTROL SYSTEM**
Robert W. Beckwith, Mount Prospect, Ill., and Eliasz
Poss, Guilford, Conn., assignors to Gulton Industries,
Inc., Metuchen, N.J., a corporation of New Jersey
Filed Aug. 11, 1967, Ser. No. 659,951
Int. Cl. H02j *1/00, 3/00*
U.S. Cl. 307—87                           10 Claims

ABSTRACT OF THE DISCLOSURE

A controller unit for controlling the automatic closure of the contacts of a selected circuit breaker connected between a bus and a power line operates in conjunction with a circuit breaker select switch contact arrangement which feeds the voltages on the bus and line sides of the selected circuit breaker to the controller unit and selects an appropriate phase limit determining impedance and circuit breaker closure signal timing determining impedance for the circuit breaker involved, so the controller will effect automatic closure of the selected circuit breaker if the proper voltage, frequency and phase matching conditions exists. To provide such a controller unit, unique phase and frequency difference measuring circuits and circuit breaker closure timing signal generating circuits are provided, the circuit breaker closing timing signal generating circuit including a comparator circuit which compares a triangular waveform representing the progressively increasing and decreasing phase difference of the bus and line voltages involved where the frequencies thereof differ, and a D.C. voltage representing the value of the slope of the triangular waveform indicating the different frequency involved. The comparator circuit generates circuit breaker closing initiating signals whenever a given degree of comparison exists between the triangular waveform and the D.C. voltage which signal occurs a given time period ahead of the time when the phase difference between the voltages reaches zero and which equals the closure time of the selected circuit breaker contacts.

---

This invention relates to apparatus for automatically effecting the closure of a circuit breaker interconnecting two power lines which have voltages applied thereto from the same or different generating systems when the voltage, phase and frequency conditions on the opposite sides of the circuit breaker are such that the closure can be effected without adverse effects on the power lines involved.

In general, the conditions on the opposite sides of a circuit breaker for closure require that the power flow resulting from such closure would be limited to a magnitude that would not re-open the circuit breaker through the protective devices which are normally associated therewith. The power flow transient resulting from closure of a circuit breaker interconnecting two power lines in a function of the frequency, voltage and phase angle differences which exists across the circuit breaker contacts at the instant of closure. The apparatus of the present invention in a very simple and effective manner compares the voltages on the opposite sides of the circuit breaker contacts as to their relative amplitude, phase and frequency and effects automatic closure of the circuit breaker contacts when the voltage, phase and frequency conditions involved are such that the two power lines can be satisfactorily interconnected.

In the case where the frequencies of the voltages on the power lines to be interconnected are slightly different, the relative phase between the two voltages may be 180 degrees apart at the instant of closure of the circuit breaker contacts or could reach such an out-of-phase condition if the generators feeding the two lines did not immediately lock-in at the desired phase and frequency. Such an out-of-phase condition would generally cause the overload device of the circuit breaker involved to immediately re-open. Wheer a large frequency difference is involved, the generators may not lock-in at the same phase and frequency immediately and undesired intervening circuit instabilities can occur. The preferred form of the present invention allows circuit breaker closure only when the frequency difference is less than a given limiting value ($\Delta f2$), for example, of the order of magnitude of about 0.1 to 0.5 cycle per second which could not cause any substantial circuit instabilities. To avoid circuit breaker contact closure when there is a frequency difference the voltages until the voltages are substantially in phase, a very unique circuit is provided which continuously monitors the phase and frequency differences of the voltages and automatically generates a circuit breaker closing signal a time period $t_1$ ahead of the point in time when the voltages are in phase, which time period is equal to the time it takes the circuit breaker contacts to close after feeding of the circuit breaker closing signal to the circuit breaker involved. The circuit which automatically generates the circuit breaker closing signal at the proper time in advance of the condition where the voltages involved are of the same phase operate completely independently of the frequency difference involved. Moreover, as will appear, the preferred form of the invention is adapted readily to provide a selection of circuit breaker closing signals occurring at different instants of time relative to the zero phase condition so that the same controller apparatus can be utilized in succession to close a number of different circuit breakers having different operating delay periods.

Frequently, a number of different sets of power lines (three lines or conductors constituting a set for a three-phase system) extends between the sets of power buses spaced many miles apart, with a circuit breaker located at each end of each set of lines. When one of the circuit breakers adjacent one of the buses opens due to a momentary overload condition or the like, the other power line will provide a voltage on the line side of the opened circuit breaker due to feedback from the other bus which will be out of phase with the voltage on the bus side of the opened circuit breaker by an amount proportional to the lengths of the lines and the impedance of the load. Thus, the detection of an acceptable phase difference between the voltages on the line and bus sides of an opened circuit breaker corresponding to the delay caused by the line lengths indicates that automatic closure of the circuit breaker is desired, whereas the detection of a greater phase difference indicates that a circuit breaker closure may not be desirable. The present invention provides a phase limit detecting circuit which is immediately selectively operable to indicate whether a pair of input voltages have a relative phase difference above or below any one of a number of phase values corresponding to the distances between the local or reference bus and other associated buses spaced a varying number of miles from the reference bus between which sets of power lines extend. Thus, in the preferred form of the invention, the circuit breaker controlling apparatus is designed so that it can be conveniently utilized to automatically control the closure of any one of a number of circuit breakers associated with different length power lines and with circuit breakers having varying closure times.

The above and other advantages and features of the invention will become more apparent upon making reference to the specification to follow, the claims and the drawings wherein:

FIG. 1 is a schematic block diagram showing a number of power transmission lines with their associated circuit breakers and the circuit breaker controlling apparatus of the present invention incorporated therein;

FIG. 2 shows the details of the circuit breaker control selection apparatus associated with one of the power buses or stations shown in FIG. 1;

FIG. 3 is a detailed block diagram of a portion of the controller unit shown in general block form in FIGS. 1 and 2, namely, the phase and frequency difference measuring circuits, the phase difference limit detecting circuit, the circuit breaker closure signal pulse generator circuit and the lower and upper frequency difference limit detector circuit;

FIG. 3A shows waveforms present in the circuit breaker closure signal pulse generator circuit;

FIG. 4 is a simplified circuit diagram of the line and bus under voltage sensing circuits constituting part of the controller unit of FIGS. 1 and 2;

FIG. 5 is a simplified circuit diagram of the line and bus voltage matching circuits forming part of the controller unit of FIGS. 1 and 2;

FIG. 6 is an exemplary circuit diagram of the phase and frequency difference measuring circuits and the circuit breaker closure signal pulse generator circuit shown in detailed block form in FIG. 3;

FIG. 6A shows circuit diagrams of an exemplary "and" gate and an inverter circuit usable in the logic circuit of FIG. 6;

FIG. 7 is a logic diagram of the bus undervoltage and voltage matching circuits shown in simplified form in FIGS. 4 and 5; and FIG. 8 shows an exemplary circuit diagram for the bus undervoltage sense circuit.

GENERAL DESCRIPTION (FIGS. 1 AND 2)

Referring now more particularly to FIG. 1, there is shown four sets of power lines #1, #2, #3 and #4 (one line in FIG. 1 representing each set of two or three conductors of a two or three phase commerical 60 cycle per second A.C. power system) extending between power buses A and B or C. The buses can be fed by a common generator or by separate generators (not shown), but the various sets of lines shown are connected into an overall linked transmission line system through circuit breakers BR–1A, 1B, 2A, 2B, 3A, 3B, 4A, 4B, etc. As shown, power lines #1 and #2 extend between buses A and B spaced 10 miles apart and power lines #3 and #4 extending between buses A and C which are spaced approximately 20 miles apart. One of the above identified circuit breakers is located at the bus end of each line. These circuit breakers are capable of carrying very large amounts of current and are frequently hydraulically or pneumatically controlled through solenoid operated valves. When the solenoid is energized, a significant time delay occurs, like .1 to .5 second, before the contacts of the circuit breaker close. This represents a delay from 6 to 30 cycles for a 60 cycle per second frequency. This time delay varies with the design and condition of the circuit breaker. The circuit breaker also includes the usual overload protective devices so the circuit breaker will automatically open when excessive current flows through the circuit breaker.

On the bus side of one of the sets of contacts of each circuit breaker is a transformer TR–b which could be common for all circuit breakers connected to the same bus. The transformer provides an output voltage at $a$, $a'$, $c$, $c'$, $e$, $e'$, $g$ or $g'$ which is a measure of the magnitude, phase and frequency of the voltage on the associated bus A, and on the line side of the latter set of contacts of each circuit breaker is a transformer TR–L or other potential coupling source which has an output at $b'$, $b$, $d$, $d'$, $f$, $f'$, $h$ or $h'$ which is a measure of the magnitude, phase, and frequency of the voltage at the circuit breaker end of the line. In the most preferred form of the invention, these voltages at the bus and line sides of each circuit breaker are fed to an external switch circuit 2A, 2B or 2C associated with the bus A, B, and C, involved. Each external switch circuit 2A, 2B or 2C includes a number of pairs of circuit breaker select contacts like 1a, 2a, 3a, 4a etc., adapted to be bridged one pair at a time to prepare a control solenoid of one of the circuit breakers for energization by an associated controller unit 4A, 4B or 4C. The bridging of a selected pair of contacts 1a, 2a, 3a, etc. of the external switch circuit involved will energize a relay CS–1, 2, 3 or 4 etc. to effect closure of a number of sets of contacts of the relay to be described, some of which modify a circuit in the associated controller unit for setting the phase limit at which circuit breaker closure can take place, and for setting the timing of a circuit which generates a circuit breaker closure signal depending upon the circuit breaker to be controlled by the controller unit. Some of the other contacts of the energized relay connect the output of the transformer TR–b and TR–L associated with the circuit breaker involved to the associated controller unit, and, in a preferred form of the invention, feeds a blocking voltage to the controller unit for reasons to be explained.

As will appear, the controller unit 4A, 4B or 4C associated with each bus compares the bus and line voltages on the opposite sides of the circuit breaker selected to be controlled by the controller unit with respect to their relative amplitude, phase and frequency. When the difference in any of these variables exceeds a predetermined limit, closure of the circuit breaker involved will not take place.

In the example of the invention illustrated in FIG. 1, it is desirable to set the phase limit at a phase difference related to the length between the various buses involved. For this reason, it is highly desirable that this phase limit be readily adjustable so the controller can be used with any number of different bus separations. For example, considering lines #1 and #2 extending between the buses A and B, if circuit breaker BR–1A should open because of a momentary overload condition thereat, it would be desirable automatically to re-close the circuit breaker. Under these circumstances, the voltages indicated by the output of transformer TR–L1 is a feedback of the voltage on line #2 through the bus B. Because of the length of lines #1 and #2, the phase of the voltage feedback to the transformer TR–L1 relative to that on the bus side of the circuit breaker indicated by the output of transformer TR–bL will directly be related to the spacing between the buses. In one exemplary form of the invention, the maximum phase difference permitted for circuit breaker closure between the voltages on the opposite sides of the sides of a circuit breaker having the same frequency and magnitude was 60 degrees, which typically could occur with a bus spacing of about 200 miles. For the ten mile bus spacing, the controller unit 4A was set to effect automatic re-closure of circuit breaker BR–1A (or 2A) if the phase difference did not exceed about 5 degrees. With respect to lines #3 and #4 extending between the buses A and C, the controller unit 4A was set to close the associated circuit breakers BR–3A or BR–4A if the phase difference did not exceed about 10 degrees. The controllers 4A or 4C are similarly pre-set to close the associated circuit breaker depending upon the spacing of the associated buses B and C from bus A.

EXTERNAL SWITCH CONTROL CIRCUIT (FIG. 2)

Referring now to FIG. 2 which illustrates exemplary circuitry for the external switch circuit 2A, it being understood that the other switch circuits 2B and 2C are similar to the circuit 2A. Also, FIG. 2 shows the basic sections of the controller 4A which are shown in detailed block form in FIGS. 3 through 6. The pairs of circuit breaker switch select contacts 1a, 2a, 3a and 4a are respectively connected in series with relay coils CS–1, CS–2, CS–3 and CS–4 between a common line 10 extending between the positive terminal of a source of direct current voltage 11, which may be a 125 volt D.C. voltage source commonly used in power stations, and the 125 volt bus 12. When any of these pairs of contacts are bridged, the associated relay will be energized to close the contacts thereof identified by reference numerals which correspond with the reference numerals used for the associated relay coils.

When any of the relay coils CS–1, 2, 3 and 4 are energized, the associated 1a–1a', 2a–2a' 3a–3a' or 4a–4a' contacts thereof close to couple the a, c, e or g outputs of the associated bus side transformer TR–b associated with circuit breaker BR–1A, 2A, 3A or 4A to the primary winding 18 of a transformer T1. The transformer T1 has a grounded center tapped secondary winding 20, so there will appear at the opposite ends of the secondary winding equal voltages of opposite polarity with respect to ground. The opposite ends of the secondary winding 20 are connected to bus voltage terminals B1 and B2 in the variable measuring section 22 of the controller unit 4A. (It is understood that the other controllers 4B and 4C are similar to the controller unit 4A.)

The various relay coils CS–1, 2, 3, 4 have other associated sets of contacts 1b–1b', 2b–2b' 3b–3b' and 4b–4b' interconnecting a pair of buses 24 and 26 respectively extending to the opposite ends of the primary winding 28 of a transformer T2. The outputs b, d, f and h of the line side transformers Tr–L1, L2, L3, L4 associated with the bus A circuit breakers are respectively coupled through these contacts to common lines 24 and 26 so these lines will have applied thereto the output of the line side transformer of the selected circuit breaker. The transformer T2 has a grounded center tapped secondary winding 30 connected to line voltage terminals L1 and L2 of the variable measuring section 22 of the controller unit 4A.

The relay coils CS–1, 2, 3, 4 have associated contacts CS–1d, 2d, 3d or 4d which extend between common lines 32 and 34. The common line 32 extends from a plus 12 volts terminal 33 of a power supply 31, and the line 34 extends to an input terminal 35 of a logic section 38 of the controller. As will appear, the initiation of a positive voltage on the input terminal 35 will block the logic section from operation for a time interval necessary to allow the variable measuring section 22 to adjust to the changed input voltage conditions resulting from the connection of a new set of voltages thereto.

The relay coils CS–1, 2, 3, 4 have contacts CS–1c, 2c, 3c, 4c respectively connected to the coils of solenoids S–1A, 2A, 3A, 4A forming part of the circuit breaker switches BR–1A, 2A, 3A, 4A associated with the bus A in FIG. 1. The closure of any of the contacts CS–1c, 2c, 3c, 4c will connect the associated solenoid coils to a common line 40 which is connected through a set of normally open contacts K1–1 to the positive terminal 31 of the power supply 33. The contacts K1–1 are contacts of a relay K1 which is energized by the logic section 38 of the controller 4A when the proper voltage, frequency and phase matching conditions exist which indicate that the closure of the circuit breaker involved is in order.

The relay coils CS–1, 2, 3, 4 also have contacts like CS–1e, 3e, 2g which effect the connection of phase limit determining impedances like 40–1, 40–2 and circuit breaker closure signal timing determining impedances 42–1 and 42–2 etc. to terminals R$\phi$ and RT of the variable measuring section 22 of the controller 4A.

BLOCK DIAGRAMS OF COMPONENTS OF VARIABLE MEASURING SECTION 22 (FIGS. 3–5)

In the upper left hand corner of FIG. 3 is a block diagram of a phase difference measuring circuit 32. The inputs to this circuit are the line voltage and bus voltage terminals L1 and B1. Rectifiers 44 and 46 extend from these terminals to a common point to pass only the positive going portions of the input A.C. voltage signals S1 and S2 involved to the input 47 of a voltage level responsive circuit 48 which produces at the output 49 thereof a D.C. voltage of a value V1 when a positive voltage above a given low threshold level near zero is present at the input 47 and a D.C. voltage of a value V2 in the absence of such a voltage exceeding the low threshold level. It can thus be seen that a square wave signal is obtained at the output 49 which is at the frequency of the A.C. voltage involved except where the voltage are about 180 degrees apart where a D.C. voltage results. The width of the positive and negative going portions of the square wave signal varies depending upon the relative phase between the input voltage signals S1 and S2. This square wave output of the circuit 48 is fed to an averaging circuit 50 which provides a D.C. output proportional to the average value of the square wave voltage fed to the input thereof. Where the frequency of the input voltage signals S1 and S2 are the same, the output of the averaging circuit is a steady D.C. voltage. If the frequency of the signals S1 and S2 are different, the relative phase between the signals S1 and S2 will vary and thus the D.C. output of the averaging circuit 50 will similarly vary to produce a triangular waveform W1 representing the progressively increasing and decreasing phase difference between the signals S1 and S2. The slope of the waveform W1 is an indication of the frequency difference between the signals S1 and S2. The output of the averaging circuit 50 is fed to a filter 52 which removes any operating frequency (e.g. 60 cycle per second) ripple which may have passed through the averaging circuit 50. If the triangular waveform W1 is not clamped to zero, the output of the filter 52 is preferably fed to a zero level circuit 54 which clamps the input to zero to form a modified triangular waveform W1'. The output of the zero level circuit 54 is fed to a terminal $\phi$ which is the output of the phase difference measuring circuit 43.

The output terminal $\phi$ of the phase difference measuring circuit 43 is fed to the input of a frequency difference measuring circuit 56, which provides at its output terminal $\Delta f$ a D.C. signal proportional to the slope of the waveform W1 or W1'. FIG. 3 indicates in solid lines a single output line 57 extending from the output terminal $\phi$ of the circuit 43 to the input 60 of the circuit 56, but, in the preferred form of the circuitry of the invention, the circuit 43 actually has two outputs for circuit convenience, the second output being the signal W1 coupled by a line 59 from the output of the filter 52. In any event, the triangular waveform representing one or more outputs of the phase difference measuring circuit 43 are fed to an input 60 of a differentiating network 62 and to an input 63 of a unity gain inverter 64. The output of the inverter 64 is fed to a second input 60' of the differentiating network 62. The differentiating network 62, the preferred form of which will be described later in detail, produces a D.C. voltage proportional to the slope of both the increasing and decreasing portions of the waveform W1 or W1'. Undesired ripple is removed from the differentiated signal by passing the same through a filter 70 whose output is fed to the output terminal $\Delta f$.

The output terminal $\phi$ of the phase difference measuring circuit is also connected by conductors 71 and 73 to the input 75 of a phase difference limit detecting circuit 76 which provides a logic "1" signal at its terminal G$\phi$–1 if the relative phase of the signals S1 and S2 at any instant indicated by the D.C. voltage at terminal 75 (which may be a steady or varying voltage) is below a limiting reference value, and provides a logic "0" signal if this phase is above this reference value. The input 75 is connected to a first input terminal 78 of a comparator circuit 79. The above mentioned reference value is set by the D.C. voltage fed to a reference input 77 of the comparator circuit 79. This voltage is determined by the resistance setting of a voltage divider network including a resistor 81 connected between a plus 12 volts voltage terminal 33' and the reference input terminal 77 of the comparator circuit 79. An adjustable rheostat 83 or the like provides an adjustable resistance between the input terminal 77 and ground. The maximum value of the rheostat resistance is set to a level equal to the largest expected phase indicating voltage to be utilized where the controller unit is to be shared with a number of circuit breakers as indicated in FIG. 1. Otherwise, the rheostat 83 is adjusted to the voltage which represents the limiting phase value below which the actual closure of the circuit breaker involved is to take place.

As above indicated, where the controller 4A is to be shared with a number of circuit breakers, so a number of different phase limits are to be set, different phase resistance values must be connected between the resistor 81 and the ground which is obtained by connecting an appropriately sized resistance 40–1, 40–2, etc. in parallel with the rheostat 83 depending upon which of the circuit breaker select contacts CS–1e, 2e, 3e, 4e are closed.

The $\Delta f$ output terminal of the frequency difference measuring circuit 56 is connected by conductors 82 and 84 to the reference input terminals 94 of a comparator circuit 86 forming part of a closure signal pulse generator circuit 87. The closure signal pulse generator circuit 87 has an input 88 connected to the line 71 extending from the output terminal $\phi$ of the phase difference measuring circuit 43. The input 88 constitutes the input to a voltage divider network including a series resistance 90 connected to a common line 92 extending to the input terminal 85 of the comparator circuit 86. The rheostat 96 is connected between the input terminal 85 and ground and serves as an adjusting resistance like the aforementioned rheostat 83. If the controller unit 4A is used to monitor only one circuit breaker, then the rheostat 96 is adjusted directly to provide the voltage at the input terminal 85 which will effect generation of a circuit breaker closure initiating pulse to be described at a time $t_1$ prior to the time that the phase of the signals S1 and S2 returns to a zero phase condition, as illustrated in FIG. 3A. If the controller unit 4A is to be shared with a number of circuit breakers having different closure times (which may vary from .1 to .5 second), the overall resistance value represented by the rheostat resistance 96 and a resistance 42–1, 42–2, 42–3 or 42–4 connected in parallel with the same by closure of contacts CS–1f, 2f, 3f, 4f determines the time the circuit breaker closing initiating pulse is generated.

The comparator circuit 86 is a circuit like the other comparator circuit 79 wherein a logic "1" output is provided when the fixed frequency indicating voltage fed to the input terminal 94 thereof is below the triangular reference voltage fed to the input terminal 85 thereof and a logic "0" output is provided when the voltage at the input terminal 85 is above this reference voltage. (It should be understood that the voltage fed to terminal 85 is a varying voltage and the voltage fed to terminal 94 is a finite voltage only when there is a difference in the frequency of the line and bus indicating voltage S1 and S2.) The logic "1" and logic "0" signals are preferably different steady D.C. voltages, and, in such case, the output of the comparator circuit 86 is fed to a differentiating network 96 which produce a pulse at an output terminal PS1–1 each time the D.C. voltage changes from one steady value to another. If, when the controller unit is connected to a particular circuit breaker having a given closure delay period $t_1$, the parallel resistance value of the resistance 42–1, 2, 3, or 4 connected in parallel with the rheostat 96 is selected so that the pulse generated each cycle by the differentiating network 96 just prior to the return of the phase of signals S1 and S2 having different frequencies to a zero phase condition occurs $t_1$ seconds prior to the zero phase condition.

It can be shown mathematically and is shown diagrammatically in FIG. 3A that once this resistance value is selected or adjusted for a given frequency difference between the line and bus voltages S1 and S2, the circuit 87 will automatically continue to generate pulses PS1 the same $t_1$ seconds ahead of the zero phase condition independently of the actual difference in frequency of these voltages. This is due to the fact that $\Delta f$ waveform and the W1 waveform bear the same relationship independently of the frequencies involved as illustrated in FIG. 3A, where the lines $\Delta fa$ and $\Delta fb$ represent two different frequencies for the line and bus voltages on the opposite sides of the selected circuit breaker and the waveforms W1a and W1b represent the corresponding variation in the relative phase of these voltages. It will be noted that the frequency difference line $\Delta fa$ crosses the decreasing portion of the associated phase indicating waveform W1a $t_1$ seconds ahead of the time when the waveform W1a crosses the zero axis and that the frequency difference line $\Delta fb$ crosses the decreasing portion of the associated phase indicating waveform W1b $t_1$ seconds ahead of the time that the waveform W1b crosses the zero axis. It will be assumed that the illustrated exemplary differentiating network 96 produces positive going pulses PS1–a and PS1–b during the decreasing portions of the waveforms W1a and W1b and negative going pulses PS1–a' and PS1–b' during the increasing portions of the waveforms, and that the logic section 38 of the controller unit responds only to the positive going pulses.

The output terminal $\Delta f$ of the frequency difference measuring circuit 56 is connected by conductors 82 and 82a to the input terminal 104 of a comparator circuit 106 forming part of a lower frequency difference limit detecting circuit 100, and by conductors 82 and 82b to the input terminal 104' of a comparator circuit 106' forming part of an upper frequency difference limit detecting circuit 100'. The circuits 100 and 100' are substantially identical circuits and so only one will be described in detail and corresponding elements are similarly numbered. The comparator circuit 106 has a reference voltage terminal 107 to which a voltage divider network is connected including a resistance 108 connected between a plus 12 volts terminal 33' and the reference voltage terminal 107. A rheostat 109 is connected between the terminal 107 and ground. The rheostat 109 adjusts the level at which the comparator circuit 106 will produce the logic "1" and "0" signals when the voltage at the input terminal 104 is respectively below and above the reference voltage fed to the input terminal 107. The output of the comparator circut 106 appears at an output terminal GF1–1.

The lower frequency difference limit detecting circuit 100 is adjusted, for example, so that it produces a logic "1" output for a voltage at terminal 104 indicating a frequency difference ($\Delta f_1$) at or below about .05 cycle per second which indicates that the two frequencies involved are substantially identical, where the phase difference between the line and bus voltages will not vary much during the time interval necessary for circuit breaker contacts to close after receiving a circuit breaker closure signal.

The upper frequency limit detecting circuit 100' has an upper frequency difference limit adjusting potentiometer 109' which is adjusted so that a logic "1" output is obtained at an output terminal GF2–1 of the circuit if the voltage fed to the input terminal 104' of the comparator circuit 106' indicates a frequency difference $\Delta f_2$ of sufficient magnitude (such as .1 to .5 cycle per second) that appreciable phase changes can take place between the line and bus voltages during the closure delay period of the selected circuit breaker.

The level of the voltage which can be expected on a "dead" line or bus varies widely. If an open circuit breaker is connected to a long line extending between buses having other energized lines extending therebetween, the voltage of the "dead" line may be as high as 50% of normal. In other cases, the voltage on a "dead" line may be less than 5% of normal. It is, therefore, desirable to have the facility of adjusting undervoltage detectors over at least the 5 to 50% range to provide best assurance of closure on a genuine "dead" line or bus condition. The undervoltage sensing circuits now to be described have such adjustability.

Refer now to FIG. 4 which shows line undervoltage and bus undervoltage sensing circuits 110 and 110', respectively, which are circuits which apply to their respective output terminals GL'–1 and GB'–1 a logic "0" signal if the line or bus voltage involved is above a value indicating a "dead" bus and a logic "1" signal if the line or bus voltage is below the "dead" indicating level. (Since the circuits 110 and 110' are identical, only one of the circuits will now be described. The corresponding elements of these circuits are similarly numbered.

As shown in FIG. 4, the line terminals L1 and L2 are respectively connected through rectifiers 112 and 114, arranged to pass only the positive going portions of the signals involved, to the end of a resistor 115 whose opposite end is connected to one plate of a capacitor 117 whose opposite plate is grounded. A potentiometer 119 is coupled across the capacitor 117, the wiper 119a of the potentiometer 119 being connected to the input of a voltage level sensing circuit 120. The capacitor 117 will be charged to a voltage depending upon the average value of the voltage on the terminals L1 and L2. The wiper 119a of the potentiometer 119 will have a voltage thereon depending on the charge on capacitor 117 and the position of the wiper which adjusts the "dead" voltage level desired above which the level sensing circuit 120 will provide a D.C. output at output terminal GL'–1 representing the logic "0." The circuit produces a logic "1" output on the output terminal G1'–1 if the line voltage involved is so low as to indicate a "dead" line. Similar outputs are provided at the output terminal GB'–1 if the bus voltage is above or below a "dead" bus indicating voltage.

Refer now to FIG. 5 which illustrates a line or bus voltage matching circuit 130 which forms part of the variable measuring section 22 of the controller 4A. This circuit 130 provides a logic "1" signal at the output terminal GM–1 if the difference between the line and bus voltages on the opposite sides of the selected circuit breaker are below a selected limit, as, for example, below 20 volts, which would indicate that one of the conditions for effecting a circuit breaker closure operation are present. The signal at the terminal GM–1 would be a logic "0" signal if the voltage difference was above the selected limit involved.

The circuit 130 has a pair of full wave rectifier circuits 132 and 134 to be described which are fed from the line and the bus terminals L1–L2 and B1–B2 respectively. The full wave rectifier circuits 132 and 134 have outputs 132–1 and 132–2 and 134–1 and 134–2 at which D.C. positive and negative D.C. voltages respectively appear corresponding to the magnitudes of the A.C. signals fed to the line terminals L1–L2 and B1–B2, respectively. The D.C. outputs of the rectifiers circuits 132 and 134 are connected into a bridge circuit generally indicated by reference numeral 135. As illustrated in FIG. 5, the bridge circuit 135 have fixed resistors 138 and 140 connected by the potentiometer 142, the remote ends of the resistors 138 and 140 being respectively connected to the negative line voltage indicating output 132–2 and the positive bus voltage indicating output 134–1. The bridge also has fixed resistors 144 and 146 respectively interconnected by potentiometer 148, the remote ends of the resistors 144 and 146 being respectively connected to the positive line voltage indicating output 132–1 and the negative bus voltage indicating output 134–2. The wipers 142a and 148a of the potentiometers 142 and 148 are respectively connected to a common line 150 by rectifiers 152 and 154 respectively which are oriented to pass only positive voltages. The line 150 is connected to a voltage divider network comprising resistors 151 and 153 connected in series to ground. It should be apparent that if the wipers 142a and 148a were connected to the center points of potentiometers 142 and 148 and the other resistors in the bridge circuits are identical, matched line and bus voltages will result in zero or ground potential at the wipers 142a and 148a. Any significant unbalances of the line and bus voltage will result in the feeding of a positive voltage by the rectifier 152 or 154 to the common line 150. Such a positive voltage represents a logic "1" signal. The juncture of the resistors 151 and 153 are connected to the input of an inverter 160 which, therefore, produces a logic "1" signal at the output terminal GM–1 if the line and bus voltages are relatively matched and will produce a logic "0" signal when these voltages are not relatively matched. The voltage difference at which a positive voltage is applied on the line 150 for a given mixmatch of the line and bus voltages is determined by the adjustment of the wipers 142a and 148a.

LOGIC SECTION 38 (FIGS. 6 AND 6A)

The logic section shown in FIG. 6 responds to the various outputs of the variable measuring section 22 and provides a voltage at an output terminal DJ'–1 thereof which energizes the relay K1 (see FIG. 2) when the voltage conditions on the opposite sides of the selected circuit breaker indicate that a circuit breaker closure should be made. The logic section effects energization of the relay K1 under four combinations of conditions which are determined by "and" gates 170A, 170B, 170C and 170D.

An exemplary circuit for each of the "and" gates is shown in FIG. 6A and, as there shown, each "and" gate comprises a resistor 171 extending between the plus 12 volt terminal 33' and a number of rectifiers 125–1, 2, 3, etc. constituting the various inputs of the "and" gate. Each of the rectifiers becomes conductive whenever the voltage fed to the input or cathode side thereof is a negative voltage or a voltage lower than the plus 12 volts at the terminal 33', which negative or other voltage will be considered a logic "0" signal. If any of the rectifiers becomes conductive, the input voltage will be applied to the juncture 177 of the rectifier and resistor 171, which is the output of the "and" gate. If the voltage input to each of the rectifiers is plus 12 volts, which will be considered a logic "1" signal, the rectifiers will be non-conductive so the voltage at the output 177 of the "and" gate will be a logic "1," plus 12 volt signal. (All of the circuits of the variable measuring section 22 of the controller 4a are designed to generate such logic "1" and "0" signals.)

As previously indicated, whenever a new circuit breaker is selected to be monitored by the controller unit involved by the bridging of a pair of breaker switches select contacts 1a, 2a, etc., it will be recalled that a logic "0" signal will be generated at each of the terminals GL'–2 or GB'–2 if the associated line or bus voltages are above the "dead" indicating level and a logic "1" signal will be generated thereat if the associated line or bus voltage is below the "dead" indicating level. When both the line and the bus sides of the selected circuit breaker are "dead," there is no reason to close the selected circuit breaker, but if either the bus or line side of the selected circuit breaker is dead, it is generally desirable to close the circuit breaker to supply power to the dead line. The connections to the "and" gates 170A and 170B to be described accomplish this result.

A conductor 180 extends from the line voltage indicating terminal GL'–2 to one of the inputs of the "and" gate 170B and a conductor 182 extends between the input terminal GB'–2 and one of the inputs of the "and" gate 170A. The "and" gate 170A also has an input connected by a line 183 to the output of an inverter 184 whose input is connected to line voltage indicating terminal GL'–2, so the inverter will supply a logic "1" signal to the "and" gate 170A if the line side of the selected circuit breaker has a voltage above the value indicating a "dead" line. The "and" gate 170A has a third input delivered by a common line 185 and branch line 185a extending from a blocking circuit 187 which is triggered by a signal fed to the input terminal 35.

The bus voltage indicating terminal GB'-2 is connected through an inverter 184' to one of the inputs of the "and" gate 170B so that the "and" gate 170B cannot produce a logic "1" output unless the bus voltage involved is above the value indicating a "dead" bus. Thus, if the bus involved is "dead" and there is an acceptable line voltage present, the "and" gate 170A will produce a logic "1" output and if the line involved is "dead" and the bus has an acceptable voltage, the "and" gate 170B will produce a logic "1" output. In other words, one of the "and" gates 170A and 170B will produce a logic "1" output if either the line or bus is "dead" but not both and if the operation thereof is not blocked by the circuit 187.

It will be recalled that the input terminal 35 will receive plus 12 volts (see FIG. 2) whenever one of the circuit breakers select relays CS–1, 2, 3, 4 is energized. When such a voltage is initially delivered to the input terminal 35, the blocking circuit generally indicated by reference numeral 187 will maintain a logic "0" signal which prevents any of the "and" gates 170A, 170B, 170C and 170D from generating a logic "1" signal for a short time, to permit the variable measuring section 22 to adjust to the new voltage conditions resulting from the selection of a new circuit breaker for monitoring by the controller unit involved.

The blocking circuit illustrated in FIG. 6 includes an inverter 189 whose input is connected to the terminal 35 and whose output is connected through a rectifier 191 arranged to pass a positive voltage to one of the plates of a capacitor 193 whose opposite plate is grounded. Normally, there is a zero voltage on the terminal 35. The inverter 189 will then have a positive voltage at its output so the rectifier 191 will normally be conductive. The juncture of the rectifier 191 and the capacitor 193 is connected by a resistor 192 to the base electrode 190b of an NPN transistor 190 whose emitter electrode 190e is grounded and whose collector electrode 190c is connected to the common line 185 connected to input conductors 185a, 185b, 185c and 185d of the various "and" gates 170A, 170B, 170C and 170D. A resistor 194 is connected between the base electrode 190b and the negative voltage terminal 195' which will normally render the transistor 190 conductive which results in zero voltage on the line 185. The absence of a voltage to the input of the "and" gates 170A, 170B, 170C and 170D prevents any of their outputs from being a positive voltage (a logic "1" signal).

When a positive voltage is applied to the input terminal 35, the output of the inverter 189 will be switched to ground potential and the rectifier 191 will become non-conductive. The capacitor 193 will then discharge and recharge to a negative voltage at the terminal 195. During the discharge and recharge of the capacitor 193 to this negative voltage, a positive voltage is generated across the resistor 194 which overcomes the negative voltage at the terminal 195, thereby to render the transistor 190 momentarily conductive, placing ground potential on the line 185 to render all the "and" gates 170A, 170B, 170C and 170D inoperative to produce a logic "1" output, until the capacitor 193 becomes fully charged. A blocking period of the order of one second is usually sufficient for the variable measuring section to produce correct outputs.

FIG. 6A shows an exemplary circuit for the various inverters shown in the logic section 38. The input terminal of the inverter circuit there shown is coupled through a resistor 198 to the base electrode 200b of an NPN transistor 200. The emitter electrode 200e of the transistor 200 is grounded and the collector electrode 200c is connected through a resistance 202 to the aforesaid plus 12 volts terminal 33'. A resistor 204 is connected between the base electrode 200b of the transistor 200 and the negative terminal 195. Due to the negative bias applied to the base electrode 200b, the transistor 200 will be in a normally non-conductive state which places plus 12 volts on the output terminal of the inverter circuit which is connected to the juncture of the resistor 202 and the collector electrode 200c. When a positive voltage is applied to the input terminal of the inverter circuit, this positive voltage overrides the negative bias on the base electrode 200b and causes the transistor 200 to conduct thereby applying ground potential on the output terminal of the inverter.

Returning to the logic circuit of FIG. 6, the "and" gate 170C controls the closure of the circuit breaker under the conditions where the line and bus voltages have a frequency difference which does not exceed the lower difference limit $\Delta f1$, which, in the example being described, is .05 cycle per second. The "and" gate 170D controls the closure of the selected circuit breaker under the conditions where the bus and line voltages have a frequency difference which exceeds that $\Delta f1$ value but is less than the $\Delta f2$ value which, in the example of the invention being described, is a frequency difference from .1 at .5 cycle per second. To this end, one of the inputs to the "and" gate 170C is a conductor 206 extending to the difference frequency indicating terminal GF1-2 at which a logic "0" appears if the difference frequency involved exceeds the $\Delta f1$ value and a logic "1" signal appears if the difference frequency is less than the $\Delta f1$ value. The "and" gate 170C has another input which is connected by conductors 208 and 208' to the voltage match indicating terminal GM-2 where a logic "0" signal appears if the difference between the bus and line voltages exceeds a pre-set value and a logic "1" signal appears if the difference in the bus and line voltages does not exceed this value. The "and" gate 170C has another input connected by a conductor 210 to the terminal G$\phi$-2 at which the logic "0" signal appears if the phase difference between the bus and line voltages exceeds the preset limit and a logic "1" signal appears if the phase difference appears between these voltages does not exceed this limit. The "and" gate 170C has another input connected by conductor 212 to the output of the inverter 184' which has a logic "0" signal when the bus voltage conditions involved indicate a "dead" bus and a logic "1" signal appears when the bus voltage condition exceeds the pre-set limit for a "dead" bus.

The "and" gate 170D has an input connected by conductor 208' to the voltage match indicating terminal GM-2, an input connected by conductor 214 to the closure signal bus terminal PS1-2, an input connected by conductor 216 to the upper frequency limit indicating terminal GF2-2 and an input connected by conductor 212' to the output of the inverter 184'. It is thus apparent that, in the absence of a blocking signal on input conductor 185d, the "and" gate 170D will produce a logic "1" signal at the output thereof when there is an acceptable bus voltage, the bus and line voltages involved are of comparable value, the differences between the frequencies of the bus and line voltages is below the limit $\Delta f2$, and a circuit breaker closure pulse is generated.

The outputs of the various "and" gates 170A, 170B, 170C and 170D are connected to an "or" circuit 220 which will produce a logic "1" signal at the output thereof if the outputs of any of the "and" gates produce a logic "1" signal. The output of the "or" circuit 220 is fed to an inverter 222 which produces a logic "0" voltage whenever a logic "1" input is applied thereto and visa-versa. The output of the inverter 222 is fed to a flip-flop circuit 224 which has an input 223 connected to the output of the inverter 222 at which input a logic "0" signal is needed to set the flip-flop circuit, and an input 226 at which a logic "0" signal must appear to reset the flip-flop circuit. When the flip-flop circuit 224 is set, the output 228 thereof will have a logic "0" signal thereat and when the flip-flop circuit is reset the output will have a logic "1" signal thereat. The reset input terminal 226 of the flip-flop circuit 224 is connected to the collector electrode of the blocking circuit transistor 190, and it will be recalled that this transistor is driven into a conducting state to produce a ground or logic "0" signal at the collector electrode 190c whenever a negative voltage is fed to the input terminal 35 of the blocking circuit 187, which occurs during the standby condition when no circuit breaker is selected to be monitored by the control unit involved.

When a circuit breaker closing operation is called for, circuit 187 has completed its operation and proper condition for circuit breaker closure are met, a logic "0" signal will appear at the output 228 of the flip-flop circuit 224 which is coupled to an inverter 232 producing a logic "1" signal at the output thereof. The inverter 232 may effect energization of the relay K1 directly or through a relay driver circuit 234 having an output terminal DJ'-1 connected to the relay K1 (FIG. 2).

EXEMPLARY CIRCUITS OF PORTIONS OF VARIABLE MEASURING SECTION 22 (FIGS. 7 AND 8)

As shown in FIG. 7, the voltage level response circuit 48 of the phase difference measuring circuit 43 there shown includes a pair of NPN transistors 300 and 302 respectively arranged to form a pair of cascaded inverters which are driven into saturation when the rectified A.C. signals applied to the base electrodes 300b of transistor 300 is at a relatively small phase angle from the zero input voltage point, so that the transistors saturate from most of the half cycles of the positive going portions of these signals.

The averaging circuit 50 there illustrated is a conventional R-C network, and the filter 52 is a conventional double-T R-C network. Thee output of the filter 52 is coupled to a circuit including a pair of NPN transistors 304 and 306 which are arranged in a Darlington type circuit to provide a high input impedance to prevent overloading of the filter 52. The transistor 304 driven from the output of the filter 52 controls the drive current of the transistor 306. The emitter electrode 306e of the transistor 306 is connected through a Zener diode 310 to resistor 312 connected to the negative terminal 195. The Zener diode 310 provides a reference voltage drop which, in conjunction with the other voltages in the circuit clamp, the triangular waveform W1' to zero at the output terminal $\phi$.

As previously indicated, the frequency different measuring circuit 56 operates on the principal of measuring the slope of the increasing-decreasing portions of the triangular waveform W1' representing the variation in the phase difference between the line and bus voltages involved. As shown in FIG. 7, the line 71 extending from the $\phi$ output terminal of the phase difference measuring circuit 43 is connected by a conductor 71 to an inverter circuit 64 which, as illustrated, is a NPN transistor circuit forming a unity gain amplifier. The transistor of this circuit identified by reference numeral 320 has a collector electrode 320c constituting an output of the inverter circuit which output is coupled to the differentiating network 62. This network includes a capacitor 322 having one plate connected to the transistor collector electrode 320c and another plate connected to a rectifier 324 oriented to pass a positive voltage to a resistor 326 which is connected to ground. It is apparent that the capacitor 322 will move the D.C. component of the triangular waveform appearing at the collector electrodes 320c and, in conjunction with the resistor 326 will provide a voltage across the resistor 326 which will be a positive voltage proportional to the slope of the decreasing portion of the triangular waveform $\phi$ at the output of the phase difference measuring circuit. The capacitor 322 discharges to ground through a path including a rectifier 328 having a cathode connected between the juncture of capacitor 322 and rectifier 324 and an anode connected to the anode of a reverse connected rectifier 330 whose cathode is grounded. The juncture between the diodes 328 and 330 is connected to a plus 12 volt terminal 33' through a resistor 329.

A voltage proportional to the slope of the increasing portions of the triangular waveform W1 produced by the phase difference measuring circuit 43 is provided by a capacitor 330 having one plate connected to the aforementioned line 59 and the other plate connected through a rectifier 332 arranged to pass only a positive voltage to the resistor 326. The capacitor 330 discharges through a circuit including a rectifier 333 connected between the juncture of the capacitor 330 and the rectifier 332 and the juncture of the aforementioned resistor 329 and the rectifier 330. The ungrounded end of the resistor 326 is connected to the previously mentioned filter 70 whose output is the terminal $\Delta f$.

The terminal $\Delta f$ at which a more or less steady D.C. voltage appears indicating the difference frequency involved is coupled to the reference input terminal 94 of the comparison circuit 86 through a resistor 340. The comparison circuit 86 illustrated in FIG. 7 may include a commercially available comparison unit 342, such as Model No. $ua$710C integrated circuit high speed differential comparator unit manufactured by the Fairchild Semiconductor Division of Fairchild Camera and Instrument Corporation of Mountain View, Calif. The comparison circuit 86 further includes a transistor inverter circuit 344 which inverts the logic output of the comparison unit and provides logic voltage levels consistent with the requirements of logic section 38. The various connections to the comparison unit 342 are shown. It should be understood, however, that any well known comparison unit may be utilized which provides the various logic "1" and "0" signals required as previously described.

A resistor 343 is connected between the ungrounded end of the rheostat 96 and the input terminal 85 of the comparison circuit 86. Filter capacitors 345 and 347 are respectively connected between the comparison circuit input terminals 94 and 84 and ground.

The inverter circuit 344 includes an NPN transistor 349 whose base electrode 349b is connected by a resistor 348 to the output terminal 346 of the comparison unit 342. The transistor 349 has an emitter electrode 349e which is connected to ground and a collector electrode 349c connected through a resistor 351 to the plus 12 volt terminal 33'. The output of the inverter circuit 344 taken at the collector electrode 349c is coupled to the differentiating network 86 which includes a capacitor 355 having one plate connected to the collector electrode 349c and another plate connected to the output terminal PS1–1, and a resistor 357 connected between the latter terminal and the negative voltage terminal 195'.

As previously indicated, the voltage fed to the comparison circuit input 85 is a clamped to zero waveform corresponding to the phase difference between the line and bus voltages involved. When this voltage exceeds the voltage fed to the reference voltage terminal 94 of the comparison circuit 86, the output of the comparison circuit 86 taken at the collector electrode of the inverter transistor 349 will be at ground potential representing a logic "0" signal, so that the output of the comparison unit 342 will then be a positive voltage representing a logic "1" signal. Conversely, when the value of the voltage fed to the comparison circuit input terminal 85 drops below the reference voltage fed to the terminal 94, a 12 volt positive logic "1" voltage will appear at the transistor collector electrode 349c which shows that the output of the comparison unit 342 will then have a negative logic "0" voltage. (The comparison unit 342 with the voltage connections indicated will produce a plus 3 volt output as a logic "1" signal and a minus .05 volt output for a logic "0" signal.

It is apparent that the output of the inverter circuit 344 will be a square wave whose different levels correspond to the instants the phase difference triangular waveform goes above and below the reference voltage level referred to. This square wave voltage is fed to differentiator circuit 96 so that a positive going pulse appears across the resistor 357 when the triangular waveform drops below the reference voltage level and a negative going pulse appears across the resistor 357 when the triangular waveform rises above the reference voltage level, as illustrated in FIG. 3.

It should be understood that the numerous comparison circuits shown in FIG. 3 are identical with the comparison circuit 86 which includes the comparison unit 342 and the inverter circuit 344.

Refer now to FIG. 8 which shows an exemplary circuit diagram for the bus undervoltage circuit sense 110′ (or the line undervoltage sense circuit 110). The only portion of the circuit 110′ not previously described in connection with FIG. 3 is the level sensing circuit 120, which, as indicated in FIG. 8, is a high impedance input Darlington circuit including the NPN transistors 360 and 362 where the transistor 360 supplies drive current for the drive transistor 362 and the collector electrodes of the transistors 360 and 362 are connected together and to the output terminal GB′–1.

Also shown in FIG. 8 is the full wave rectifier circuit 132 shown in block form in FIG. 5. As there shown, line voltage terminal L1 is connected through a rectifier 369 arranged to pass a positive voltage to a resistor 366 connected to the output terminal 132–1 of the full wave rectifier circuit 132. The line voltage terminal L2 is connected through a rectifier 364′ arranged to pass a negative voltage to a resistor 366′ connected to the output terminal 132–2 of the circuit 132. The line L1 is also connected through a rectifier 368 arranged to pass a negative voltage to the juncture of the resistor 366′ and the rectifier 364′. Likewise, the line L2 is connected through a rectifier 368′ arranged to pass a positive voltage to the juncture of the resistor 366 and rectifier 364. The outputs 132–1 and 132–2 of the full wave rectifier circuit 132 are interconnected by a pair of series connected capacitors 370 and 370′ and by a pair of series connected rectifiers 372 and 372′. The juncture of the capacitors 370 and 370′ and the rectifiers 372 and 372′ are connected by a conductor 374 to ground. It is apparent from the connection of the various rectifiers in the circuit 132 that the output 132–1 thereof will provide a positive voltage with respect to ground and the output 132–2 thereof will provide a negative voltage with respect to ground proportional to the magnitudes of the line voltage. As previously indicated, the full wave rectifier circuit 134 in FIG. 5 is a circuit substantially identical to the circuit 132 just described.

It should be understood that numerous modifications may be made in the most preferred form of the invention described above without deviating from the broader aspects therein.

We claim:

1. Apparatus for automatically initiating closure of a circuit breaker switch interconnecting first and second A.C. power transmission lines where there is a frequency difference between the voltages on said lines and wherein the switch operates with a delay so it closes $t_1$ seconds after receiving a control signal initiating its closure, said apparatus comprising: first signal generating means responsive to the voltages on said transmission lines for generating a triangular waveform signal which instantaneously represents the progressive change of the absolute value of the difference in phase between the voltages on said transmission lines, second signal generating means for generating a steady D.C. signal which represents the difference in the frequencies of the voltages on said transmission lines, said D.C. signal having a value which is less than the maximum value of said triangular waveform signal, comparison means for comparing the magnitude of said triangular waveform and said D.C. signal for generating a switch closure initiating signal when said signals reach a given state of comparison $t_1$ seconds before said triangular waveform returns to a value representing zero phase difference between the voltages on said power transmission lines, and means responsive to said control signal for initiating the closure of said circuit breaker switch.

2. The apparatus of claim 1 wherein said comparison means has a first input to which the output of said first signal generating means is coupled and a second input to which the output of said second signal generating means is coupled, and said first input including means for selectively reducing the voltage fed to the comparison means from said first signal generating means to provide an adjustment in the time the circuit generates said switch closure initiating signal.

3. The apparatus of claim 2 wherein said comparison means is a circuit which provides a D.C. voltage of a first given value when one of the signals fed thereto is above the other signal and a D.C. voltage of another value when said one signal has a value below the other signal, and the comparison circuit further includes a differentiating means responsive to the latter D.C. voltage by providing pulses when said voltages vary between said values which pulses have a polarity depending on the direction of the change of the voltages, one of said pulses being said switch closure initiating signal.

4. The apparatus of claim 1 wherein said first signal generating means includes a signal level responsive circuit which provides a D.C. voltage output of a first level when the instantaneous value of the signal fed to the input thereof does not have a given polarity, and provides a D.C. voltage output of a second level when the instantaneous value of the signal to the input thereof is a voltage of said given polarity, a pair of rectifiers respectively coupled between said first and second transmission lines and the input to said signal level responsive circuit for providing a voltage of only said given polarity at the input to said signal level responsive circuit resulting from the A.C. voltage coupled from said transmission lines, whereby the output of said signal level responsive circuit is a square wave signal with the positive and negative going portions thereof having a variable width depending upon the relative phase of the voltages coupled from said power transmission line, and said first signal generating means further including averaging means for providing a D.C. voltage corresponding to the varying average value of the square wave output of said signal level responsive circuit.

5. The apparatus of claim 4 wherein said signal level responsive circuit further includes voltage offset means responsive to the output of said averaging means for providing a triangular shaped waveform representing the progressively increasing and decreasing phase difference between the voltages of said transmission lines clamped to zero voltage level.

6. The apparatus of claim 5 wherein the second signal generating means includes differentiating means which provide a signal proportional to the rate of change of the triangular waveform of the first signal generating means.

7. The apparatus of claim 6 wherein said second voltage generating means is a circuit for providing differentiating voltages of the same polarity for both the increasing and decreasing portions of the triangular waveform output of said first signal generating output means.

8. In an electrical power transmission system including a first and a second set of buses separated many miles and between which at least a first and second set of power lines extend, a third set of buses separated from said first set of buses by substantially a different number of miles than said first set of buses is separated from said second set of buses, a third and fourth set of power lines extend between said first and third set of buses, and a circuit breaker switch at each end of each set of power lines near one of said buses which circuit breaker switch automatically opens on an overload condition in the section of the power line involved, the improvement comprising: controller means at each set of buses for automatically closing a selected open one of said circuit breaker switches thereat when the phase difference of the voltages on the bus and line sides of the selected circuit breaker is no greater than a given predetermined value, select switch means for selecting which one of said circuit breakers is to be monitored by said controller means, said controller means at each set of buses including a phase difference measuring circuit having a pair of inputs to which the voltages whose phases are to be compared are to be fed and a phase limit detecting circuit coupled to the output of said phase difference measuring circuit for effecting the closure of the selected circuit breaker switch when the phase difference of the voltages involved exceeds a given pre-set limit, the phase limit to which said phase limit detecting circuit responds being determined by the value of an active phase limit determining impedance connected into the phase limit detecting circuit, respective phase limit determining impedances associated with the respective circuit breaker switches at the set of buses involved which switches are connected to power lines extending to different sets of remote buses, said select switch means connecting into the phase limit detecting circuit the phase limit determining impedance associated with the selected circuit breaker switch involved, and each phase limit determining impedance being of a value to provide a phase limit which is equal to the difference in phase of the voltages on the bus and line sides of the associated circuit breaker switch when the circuit breaker switch involved is opened-circuited and a voltage is fed back to the line side thereof from the remote bus to which the power line involved is connected.

9. The electrical power transmission line system of claim 8 wherein said phase difference detecting circuit provides an output D.C. voltage which is a measure of the phase difference of the signals fed to said inputs of said phase difference measuring circuit, said phase limit detecting circuit having a first input to which the output of said phase difference measuring circuit is coupled and a second input to which a reference voltage is connected to be compared with the voltage fed to said first input and representing said pre-set phase difference limit, said respective phase limiting determining impedances varying the value of the reference voltage fed to said second input of said phase limit detecting circuit.

10. In an electrical power transmission power system including a first set of buses from which extend a number of different sets of power lines and a circuit breaker switch at the bus end of each of said sets of power lines which circuit breaker switch automatically opens on an overload condition in the section of the power line involved and is closed upon receiving a circuit breaker closure signal, each of the circuit breaker switches closing after receiving such signal with a delay period which varies with the design and condition of the particular circuit breaker switch involved, the improvement comprising: controller means for automatically closing a selected circuit breaker switch at an instant when the phase difference between the voltages on the bus and line sides of the selected circuit breaker switch is near zero, select switch means for selecting which of said circuit breaker switches are to be monitored by said controller means, a phase difference measuring circuit having a pair of inputs to which the voltages on the bus and line sides of the selected circuit breaker switch are fed and providing a triangular waveform signal of a given polarity which instantaneously represents the change of the absolute value of the difference in phase between the voltages involved, a frequency difference measuring circuit for generating a steady D.C. signal which represents the difference in frequencies of the voltages on the bus and lines sides of the selective circuit breaker switch, said D.C. signal having a value which is less than the maximum value of said triangular waveform signal, a comparison circuit for comparing the magnitude of said triangular signal waveform and said D.C. signal and for generating a circuit breaker switch closure initiating signal when said triangular waveform and said D.C. signal reaches a given state of comparison a given time period before the triangular waveform signal returns to a value representing zero phase difference between the voltages involved, said comparison circuit having a first input to which the output of said phase difference measuring circuit is fed and a second input coupled to the output of said frequency difference detecting circuit, and a voltage divider network connected to one of the inputs of one of said comparison circuits to vary the voltage fed thereto, said voltage divider network including switch means controlled by said select switch means to provide a circuit breaker switch closure initiating signal occurring a given time period ahead of the time the triangular waveform returns to a zero phase difference indicating value which time period corresponds to the delay period of the selected circuit breaker switch.

References Cited

UNITED STATES PATENTS 3,210,556  10/1965  Billings _____ 307—87

ROBERT K. SCHAEFER, Primary Examiner

H. J. HOHAUSER, Assistant Examiner